Dec. 18, 1956  R. L. ATKIN  2,774,632
TIRE RIM
Filed Dec. 29, 1954  2 Sheets-Sheet 1

INVENTOR.
RUPERT L. ATKIN.
BY

Dec. 18, 1956  R. L. ATKIN  2,774,632
TIRE RIM

Filed Dec. 29, 1954  2 Sheets-Sheet 2

INVENTOR.
RUPERT L. ATKIN.
BY

United States Patent Office 2,774,632
Patented Dec. 18, 1956

2,774,632
TIRE RIM

Rupert L. Atkin, Grosse Pointe Woods, Mich., assignor to Kelsey-Hayes Wheel Company, Detroit, Mich., a corporation of Delaware Application December 29, 1954, Serial No. 478,305

3 Claims. (Cl. 301—13)

The invention relates to tire rims and has for one of its objects to provide an improved tire rim which may be economically manufactured.

The invention has for another object to provide a tire rim of the annular well or drop-center type formed by cooperating endless annular members secured to each other.

The invention has for a further object to provide one of the annular members with a frusto-conical portion providing a frusto-conical surface and with a second portion providing a substantially radially extending surface, one of the surfaces being engageable with a clamp and the other of the surfaces being engageable with a seat.

With these and other objects in view the invention resides in the novel features of construction as more fully hereinafter set forth.

Figure 2:
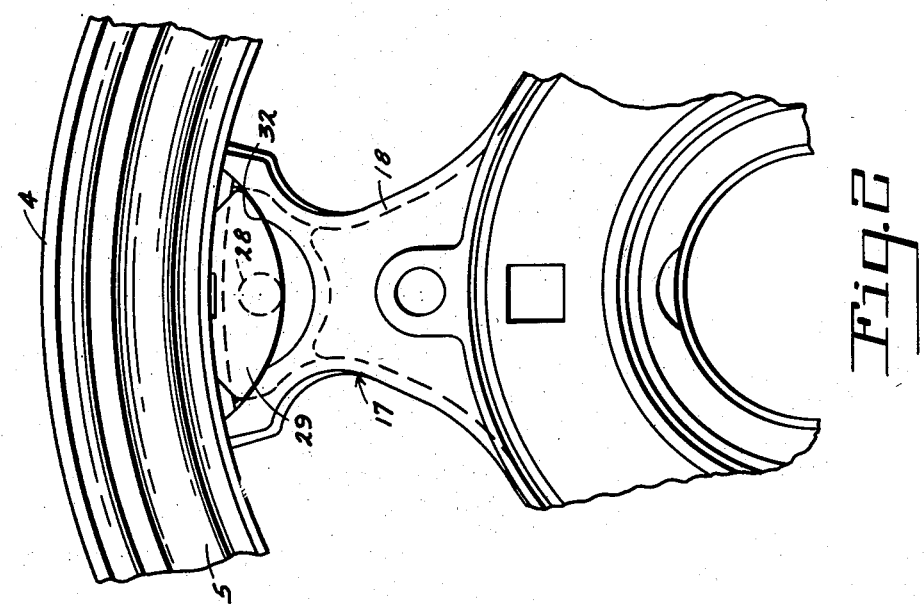
Figure 2 is an inboard elevation.
Figure 1:
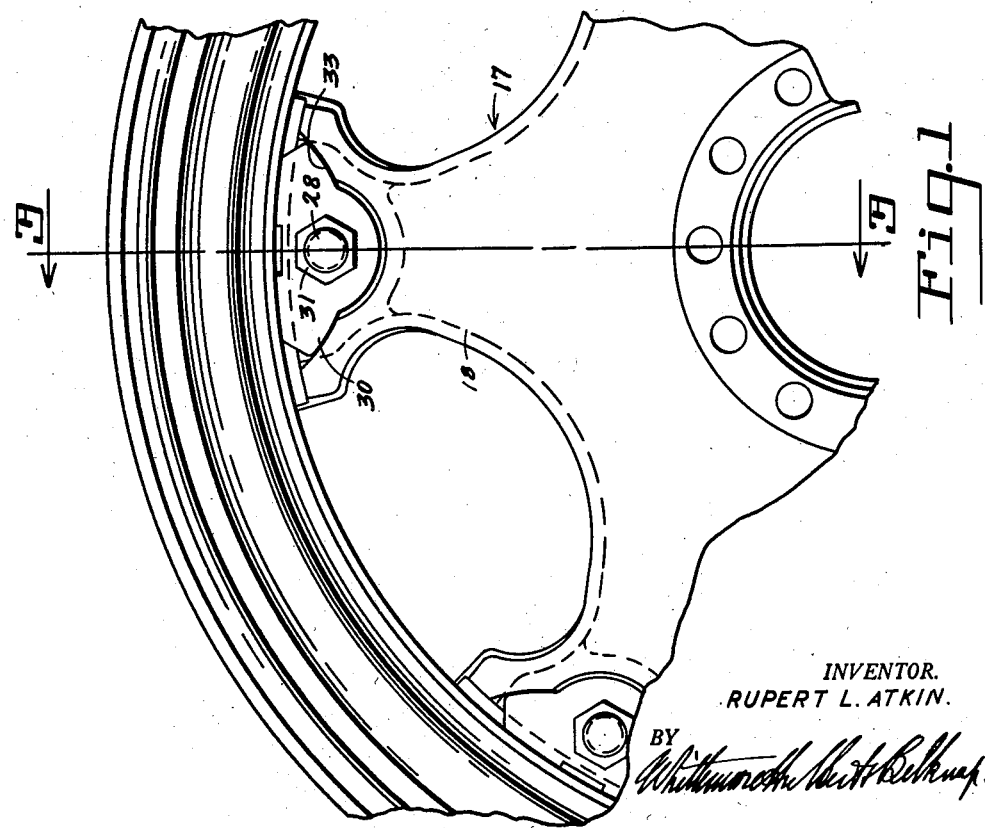
Figure 1 is an outboard elevation of a portion of a wheel having a tire rim embodying the invention.
Figure 3:
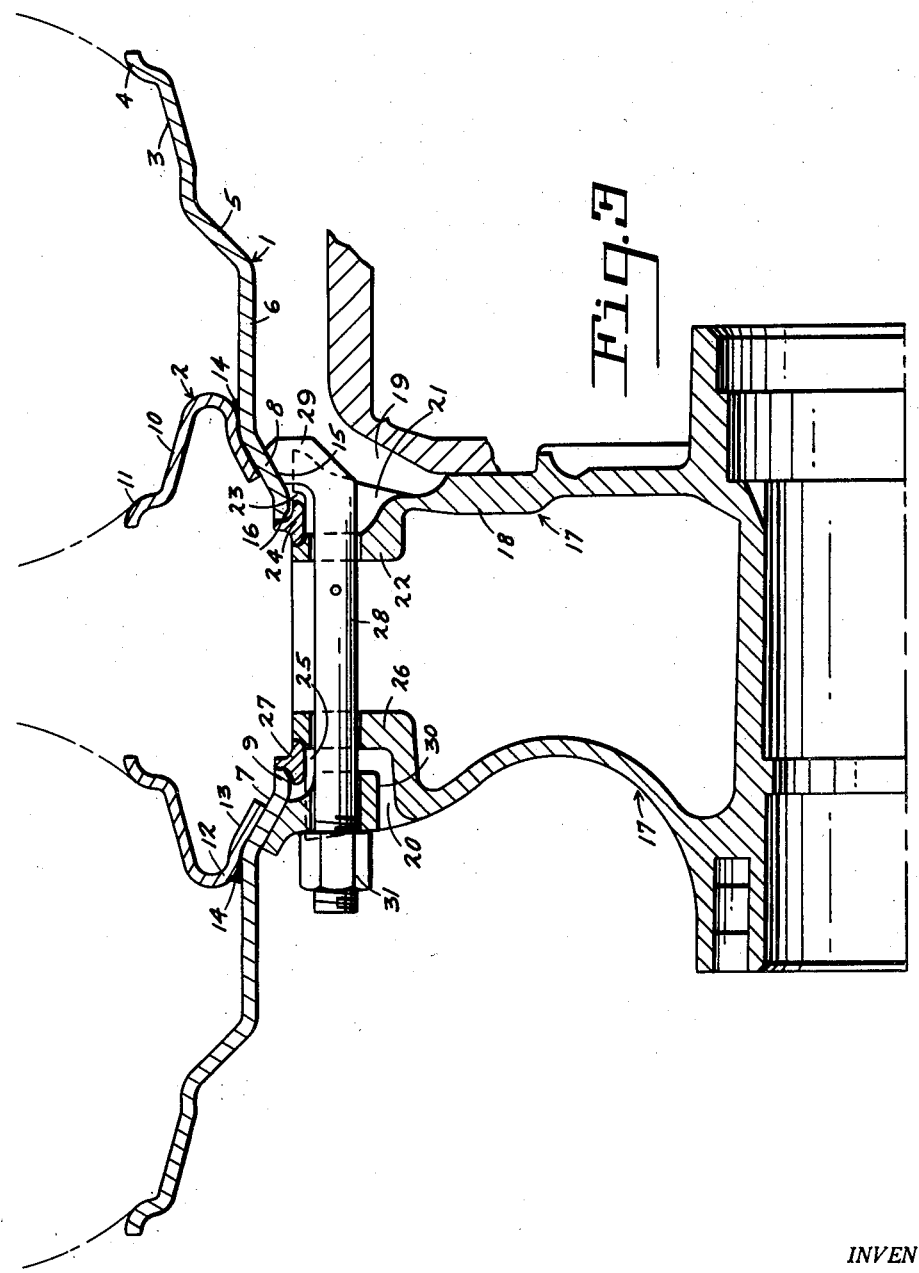
Figure 3 is a cross-section on the line 3—3 of Figure 1.

The tire rim is of the type having an annular well and is formed of the cooperating endless annular members 1 and 2 secured to each other. The annular member 1 is one-piece and has the tire bead seat 3, the tire retaining flange 4 at one edge of the tire bead seat, the side wall 5 at the other edge of the tire bead seat, the base 6 connecting into the radially inner edge of the side wall 5 and the mounting portion 7 connecting into the edge of the base spaced from the side wall. The mounting portion comprises the frusto-conical portion 8 progressively decreasing in diameter from the base 6 and the cylindrical terminal portion 9.

The annular member 2 is one-piece and has the tire bead seat 10, the tire retaining flange 11 at one edge of the tire bead seat, and the return bent portion 12 at the other edge of the tire bead seat. The return bent portion terminates in the frusto-conical flange 13 fitting the frusto-conical portion 8. The part of the return bent portion extending over the base 6 is welded at 14 to the base. The construction of the annular member 2 is such that it is V-shaped in cross-section and the part of the return bent portion above the base of the annular member 1 forms a side wall of the annular well of the rim and cooperates with the base 6 and the side wall 5 to complete the annular well.

The frusto-conical portion 8 provides the generally radially inwardly facing frusto-conical surface 15 and the terminal portion 9 provides at its edge the annular substantially radially extending surface 16, these two surfaces being engageable with a clamp and a seat to detachably mount the rim on a wheel body.

As shown in the present instance, the tire rim forms part of a dual rim wheel having the wheel body 17 formed with hollow spokes 18 radiating from a hub. The spokes have at their radially outer ends the inboard and outboard pockets 19 and 20 respectively, with the inboard pockets opening radially outwardly and axially inwardly or in an inboard direction, and the outboard pockets opening radially outwardly and axially outwardly or in an outboard direction. The inboard pockets have the side walls 21 and the end walls 22 and the radially outer edges of the side walls are formed with the notches 23 for receiving the transversely split inboard aligning ring 24. The outboard pockets have the side walls 25 and the end walls 26 and the radially outer edges of the side walls terminate short of the end walls so that the outboard aligning ring 27 may be readily sleeved over the side walls and against the end walls.

The inboard and outboard aligning rings 24 and 27 are alike and are of generally T-shaped cross-section with the stem of the T providing on either side a radial seat for abutment by the surface 16 of the rim. Also, the head of the T provides a pilot merging into either side of the stem to function in centering the rim.

To clamp the inboard and outboard rims to the aligning rings, I have provided the bolts 28, the clamps 29 and 30 and the nuts 31. The bolts have shanks which extend freely through openings in the end walls 22 and 26. The clamps 29 slidably engage and are supported by spaced bearings 32 on the side walls 21 of the inboard pockets and these clamps provide radially outwardly facing frusto-conical surfaces of the same angle as and engaging the frusto-conical surface 15 of the inboard rim. The clamps 29 are preferably integral with the bolt shanks. The clamps 30 slidably engage and are supported by spaced bearings 33 on the side walls 25 of the outboard pockets and provide radially outwardly facing frusto-conical surfaces of the same angle as and engaging the frusto-conical surface 15 of the outboard rim. The clamps 30 are sleeved over the bolt shanks and are abutted by the nuts 31 which are threaded on the bolt shanks.

The construction of the rim is such that its parts may be economically manufactured and assembled and provide a simple mounting. The construction is also such that the rim is adapted particularly for use with a tire casing to form a tubeless tire.

What I claim as my invention is:

1. A tire rim of the type having an annular well comprising an endless annular member having a tire bead seat, a tire retaining flange at one edge of said tire bead seat, a well side wall at the other edge of said tire bead seat, a well base connecting into said side wall and a mounting portion connecting into the edge of said base spaced from said side wall and extending axially beyond said base and decreasing in diameter away from said base, and a second endless annular V-shaped member having a tire bead seat, a tire retaining flange at one edge of said last-mentioned tire bead seat and a return bent portion at the other edge of said last-mentioned tire bead seat rigidly secured to said base and extending over said mounting portion to reinforce the latter, said return bent portion cooperating with said base and side wall to form the annular well, said mounting portion providing a frusto-conical surface and a substantially radially extending surface, one of said surfaces being engageable with a clamp, and the other of said surfaces being engageable with a seat.

2. A tire rim of the type having an annular well comprising endless annular members rigidly secured to each other, one of said members having a frusto-conical portion providing a frusto-conical surface and a second portion providing a substantially radially extending surface, one of said surfaces being engageable with a clamp and the other of said surfaces being engageable with a seat, the other member being generally V-shaped and having one leg defining a bead seat of said rim and the other leg extending along and reinforcing said frusto-conical portion.

3. A tire rim comprising endless annular members rigidly secured to each other and forming a drop-center rim, one of said members having a frusto-conical portion extending axialy beyond the well of the rim and decreasing in diameter away from the well, and a terminal portion at the free edge of said frusto-conical portion, said frusto-conical portion and last-mentioned portion providing mounting surfaces, the other member being generally V-shaped and having one leg defining a bead seat and the other leg extending along and reinforcing said frusto-conical portion.

References Cited in the file of this patent

UNITED STATES PATENTS

| | | |
|---|---|---|
| 1,999,028 | Acton | Apr. 23, 1935 |
| 2,521,260 | Sinclair | Sept. 5, 1950 |

FOREIGN PATENTS

| | | |
|---|---|---|
| 740,371 | France | Nov. 14, 1932 |